United States Patent [19]

Inukai et al.

[11] 4,192,474
[45] Mar. 11, 1980

[54] WEBBING RETRACTOR FOR SEATBELT SYSTEM

[75] Inventors: Mitsuo Inukai, Nagoya; Masahiro Iwatsuki, Toyoake; Keiichi Tamura, Nagoya, all of Japan

[73] Assignee: Kabushiki Kaisha Tokai Rika Denki Seisakusho, Aichi, Japan

[21] Appl. No.: 939,421

[22] Filed: Sep. 5, 1978

[30] Foreign Application Priority Data

Sep. 8, 1977 [JP] Japan .................. 52-108391

[51] Int. Cl.² .................. A62B 35/02; B65H 75/48
[52] U.S. Cl. .................. 242/107.4 A
[58] Field of Search .................. 242/107.4 R, 107.4 E; 297/388; 280/744–747

[56] References Cited

U.S. PATENT DOCUMENTS

| | | | |
|---|---|---|---|
| 4,059,242 | 11/1977 | Tanaka | 242/107.7 X |
| 4,071,204 | 1/1978 | Booth | 242/107.4 B |
| 4,090,678 | 5/1978 | Yamanashi | 242/107.4 A |

*Primary Examiner*—John M. Jillions
*Attorney, Agent, or Firm*—Koda and Androlia

[57] ABSTRACT

An occupant retaining webbing is wound up to a take-up shaft supported on a frame, a ratchet wheel is secured to said take-up shaft, and a pawl tiltingly movably supported on the frame and is engaged with the ratchet wheel to thereby stop wind-out of the webbing. Said take-up shaft pivotally supports a working plate which guides a balancer provided thereon with a pair of pawls, and due to the operation of an acceleration detector either one of the pawls is engaged with the ratchet wheel, whereby the working plate tilts the pawl to be engaged with the ratchet wheel.

12 Claims, 4 Drawing Figures

WEBBING RETRACTOR FOR SEATBELT SYSTEM

BACKGROUND OF THE INVENTION

1. Field of the Invention

The present invention relates to a webbing retractor for use in a seatbelt system for restraining and protecting an occupant of a road vehicle in an emergency of the vehicle.

2. Description of the Prior Art

For the webbing retractors, such an arrangement is commonly used that the remaining portion of the webbing for restraining the occupant is wound up to the retractor by a biasing force, made it possible to be freely wound out in the normal running condition of the vehicle, and, in an emergency, a pawl is engaged with a ratchet wheel solidly secured to the take-up shaft, whereby wind-out of the webbing is instantaneously stopped, thus reliably securing the occupant.

However, with such a webbing retractor, in an emergency of the vehicle, when the pawl is engaged with the ratchet wheel, the tooth top of the pawl impinges on the tooth top of the ratchet wheel and the pawl is sprung back, and it takes a long period of time for the pawl to be reliably engaged with the ratchet wheel to stop wind-out rotation of the ratchet wheel and the take-up shaft, during which time the webbing is wound out to an appreciable extent, whereby the occupant becomes restrained imperfectly, thus incurring such possibilities that the function of securing safety of the occupant is impaired.

SUMMARY OF THE INVENTION

In view of the fact described above, one object of the present invention is to provide a webbing retractor wherein, in an emergency of the vehicle, the pawl is not sprung back by the tooth top of the ratchet wheel and reliably engaged with the ratchet wheel to instantaneously stop the wind-out rotation of the ratchet wheel and the take-up shaft. In the webbing retractor according to the present invention, a balancer actuated by an acceleration detector is transferred radially of the ratchet wheel, the engagement of the balancer with the ratchet wheel causes the working plate pivotally supported on the frame to oscillate, whereby the pawl is engaged with the ratchet wheel, thereby enabling to quickly and reliably stop wind-out rotation of the webbing.

Description will hereunder be given of one embodiment of the present invention with reference to the drawings.

DESCRIPTION OF THE PREFERRED EMBODIMENT

Figure 1:
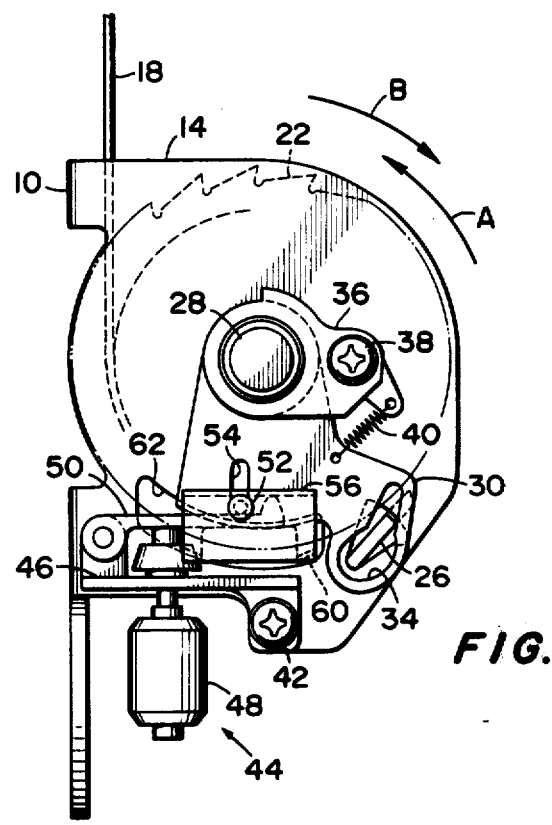
FIG. 1 is a front view showing one embodiment of the webbing retractor according to the present application.
Figure 2:
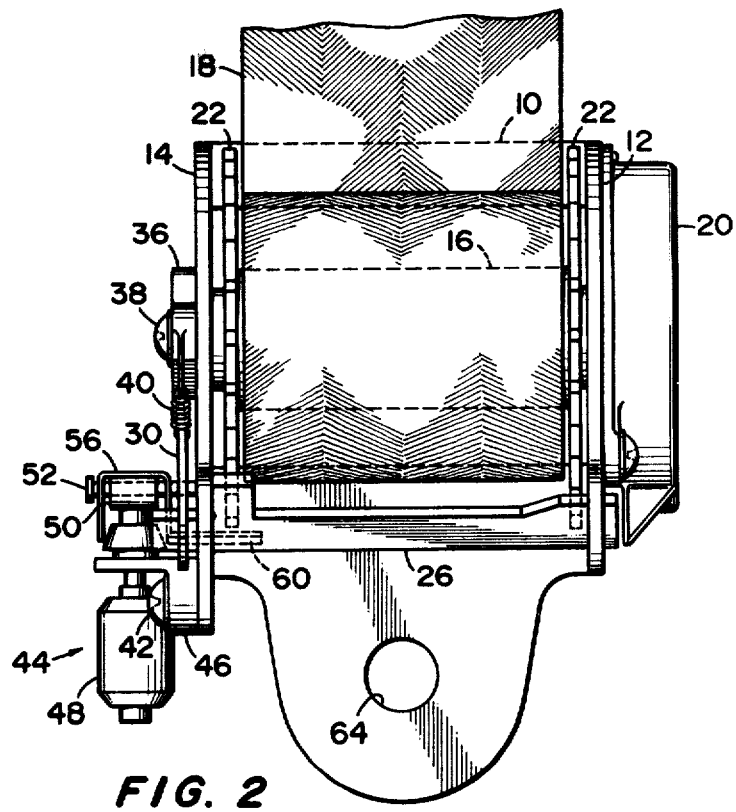
FIG. 2 is a side view of FIG. 1.
Figure 3:
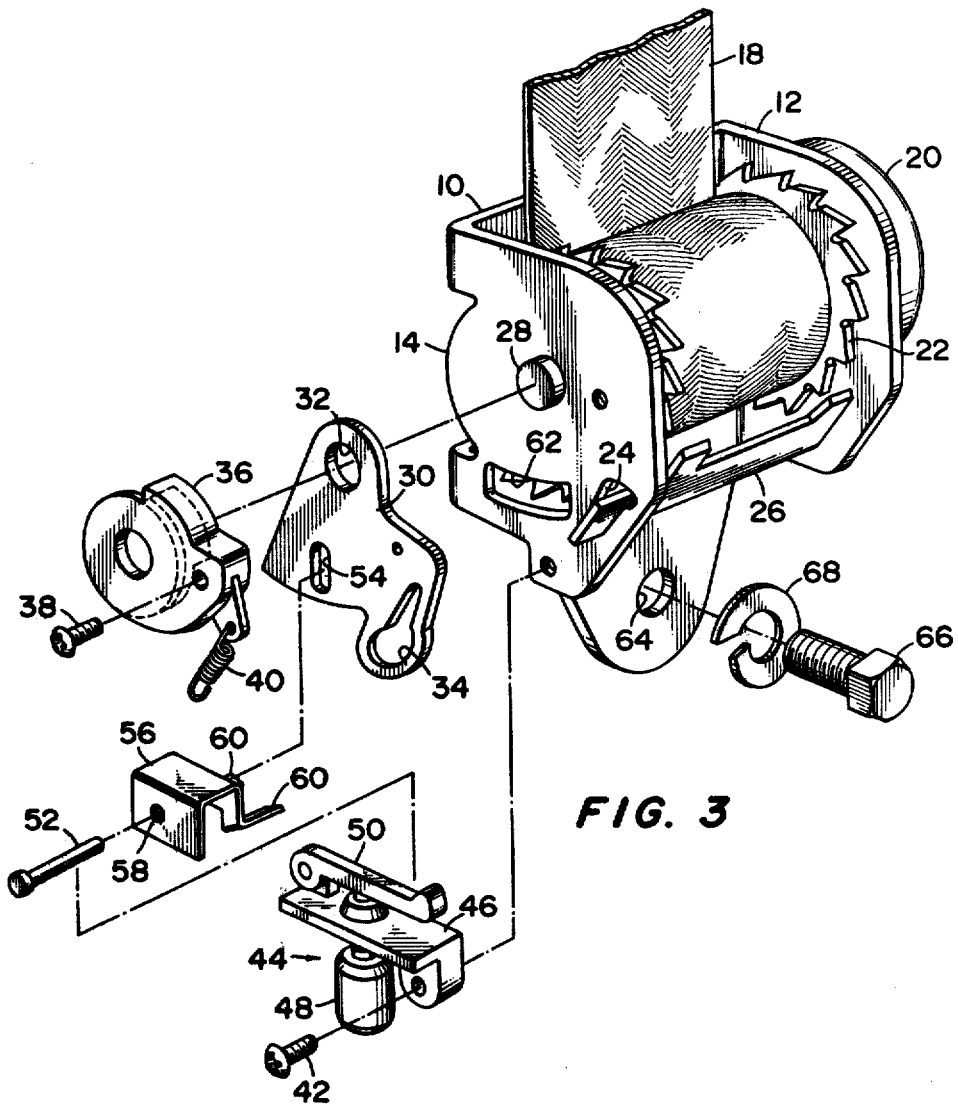
FIG. 3 is a broken oblique view thereof.

As shown in FIGS. 1 through 3, a frame 10 made of a thin sheet metal is bent into a letter "U" shape, and pivotally supported on legs 12, 14 connected to opposite end portions of the frame 10 and substantially in parallel with each other is a take-up shaft 16 which winds up the end portion of the webbing 18 in layers. Further, spiral spring wind-up means 20 is provided between an end portion projecting from the leg 12 and the leg 12 so as to bias the take-up shaft 16 in the direction of wind-up rotation of the webbing 18 (the direction indicated by an arrow A in (FIG. 1). With this arrangement, if the webbing 18 is pulled by the occupant against the biasing force of the spiral spring means, then the webbing can be wound out, rotating the take-up shaft 16 in the direction of wind-out of the webbing 18 (the direction indicated by an arrow B in FIG. 1).

Furthermore, solidly secured to opposite sides of the take-up shaft 16 winding up the webbing 18 to the central portion thereof are a pair of ratchet wheels 22 adapted to rotate along with the take-up shaft 16. On the other hand, oscillatingly pivoted in cutouts 24 penetratingly provided in the legs 12, 14 of the frame is a pawl 26 being opposed to the ratchet wheel 22. The gravity of the pawl 26 is determined such that the pawl 26 is biased in the direction of being separated from the outer periphery of the ratchet wheel 22 by gravity. When the pawl 26 is oscillated against the biasing force, it engages the ratchet wheel 22 to prevent wind-out rotation of the ratchet wheel 22 and the take-up shaft 16.

A thin plate-like working plate 30 is supported by an end portion 28 of a shaft projecting from the leg 14 of the take-up shaft 16 through a bearing hole 32 which is the oscillating center of the working plate. Penetratingly provided at one end portion of the working plate 30 is an elongate hole 34 which is coupled onto the end portion of pawl 26 projecting from the leg 14. Here, the inner diameter of the elongate hole 34 is made slightly larger than the contour of the pawl 26, so that the elongate hole 34 abuts against the pawl 26 when the working plate 30 slightly oscillates about the take-up shaft 16.

Further, a stopper 36 is coupled onto the shaft end portion of the take-up shaft onto which this working plate 30 is coupled, and solidly secured to the leg 14 of the frame 10 through a mounting screw 38 so as to function as a catch for the working plate 30, and to function as a stopper when the working plate 30 oscillates in the counterclockwise direction in FIG. 1, and tilts the pawl 26 to a position where it does not abut against the ratchet wheel 22 in such a case that the working plate 30 abuts against the stopper 36. Here, a tension coil spring 40 is stretched between the stopper 36 and the working plate 30, by which the stopper 36 biases the working plate 30 in the counterclockwise direction in FIG. 1. When the working plate 30 rotates in the clockwise direction in FIG. 1 against the biasing force of the coil spring 40, the elongate hole 34 is adapted to oscillate the pawl 26 to engage the pawl 26 with the ratchet wheel 22.

Next, an acceleration detector 44 is installed at the lower portion of the leg 14 of the frame 10 through a mounting screw 42. In this acceleration detector 44, a pendulum 48 is suspended from a bracket 46. When the pendulum 48 detects acceleration of the vehicle, an arm 50 pivoted on the bracket 46 is adapted to tilt to thereby elevate a pin 52 mounted on the arm 50.

One end portion of this pin 52 is adapted to be guided by an elongated hole 54 penetrated in the working plate 30, and, when urged up by the arm 50 of the acceleration detector 44, the pin 52 is adapted to move substantially radially of the ratchet wheel 22.

Here, pivotally supported by this pin 52 is a balancer 56. The balancer 56 is made of a thin sheet metal which is bent into a substantially letter "U" form, and cylindrical holes penetrated in both legs of the balancer 56 are adapted to receive the pin 52. Two pawls 60 projecting from one of the legs extend through a rectangular hole 62 penetrated in the leg 14 of the frame 10 to positions adjacent the rachet wheel 22, and are opposed to the tooth tops of the ratchet wheel in slightly spaced apart relation therewith in the radial direction of the ratchet wheel. With this arrangement, when the pin 52 is urged up by the acceleration detector 44, the balancer 56 rises along with the pin 52 whereby either one of the pair of pawls is engaged with the tooth top of the ratchet wheel 22. Furthermore, in the case the ratchet wheel 22 is rotating in the direction of wind-out rotation of the webbing 18, if either one of the pawls 60 of the balancer 56 engages the ratchet wheel 22, then the balancer 56 is subjected to a force in the circumferential direction of the ratchet wheel 22, and this force is transmitted to the working plate 30 through the pin 52 and the elongate hole 54 whereby the working plate 30 is rotated about the take-up shaft 16.

The balancer 56 is mounted on the pin 52 and at a position adjacent to the forward end of the arm 50, with the center of gravity thereof being so determined that the two pawls 60 are disposed horizontally, and hence, is adapted not to be accidentally separated from the working plate 30. Additionally, in order to reliably support the balancer 56, a bracket for pivotally supporting the pin 52 may be installed on the working plate 30, as necessary.

In addition, as shown in FIG. 3, a mounting hole 64 is penetrated at the lower portion of the frame 10 which is adapted to be solidly secured to a suitable position of the vehicle through a mounting bolt 66 and a washer 68.

In the present embodiment with the arrangement as shown above, in order for the occupant to put the webbing 18 on, he should pull the webbing 18 against the biasing force of the spiral spring wind-up means 20 to rotate the take-up shaft 16 in the direction of wind-out rotation (as indicated by an arrow B in FIG. 1), so that he can easily put the webbing on.

Next, in case the vehicle has an emergency such as collision after the occupant has put the webbing 18 on, the pendulum 48 detects acceleration of the vehicle to tilt, and the arm 50 pivotally supported by the bracket 46 urges the pin 52 up to thereby engage the pawls 60 of the balancer 56 with the ratchet wheel 22.

In such an emergency of the vehicle as described above, the occupant wearing the webbing 18 is violently thrown out in the direction of collision of the vehicle, and consequently, the ratchet wheel 22 is being rotated violently in the direction of wind-out rotation of the webbing (as indicated by the arrow B in FIG. 1). For this, the balancer 56 engaged with the ratchet wheel 22 is subjected to a force in the direction of this wind-out rotation, and the force is transmitted through the pin 52 to rotate the working plate 30 about the take-up shaft 16. Consequently, the elongate hole 34 of the working plate 30 causes the pawl 26 to turn in the cutout 24 to engage the ratchet wheel 22, whereby the ratchet wheel 22 and the take-up shaft 16 are sharply stopped, thereby reliably restraining the occupant wearing the webbing 18.

Study will hereunder be made on the case where the pawl 60 of the balancer 56 is sprung back by the tooth top of the ratchet wheel 22 at the initial stage of the engagement of the click 60 with the ratchet wheel 22 in an emergency of the vehicle as described above. Since the balancer 56 is freely rotatable about the pin 52, even if one of the pawls 60 of the balancer 56 is sprung back by the tooth top of the ratchet wheel 22, the other of the pawl 60 is reliably engaged with the ratchet wheel 22 by the strong springing-back force so as to rotate the working plate 30 about the take-up shaft 16 without causing the tooth top of the pawl 26 to impinge on the tooth top of the ratchet wheel 22.

Figure 4:
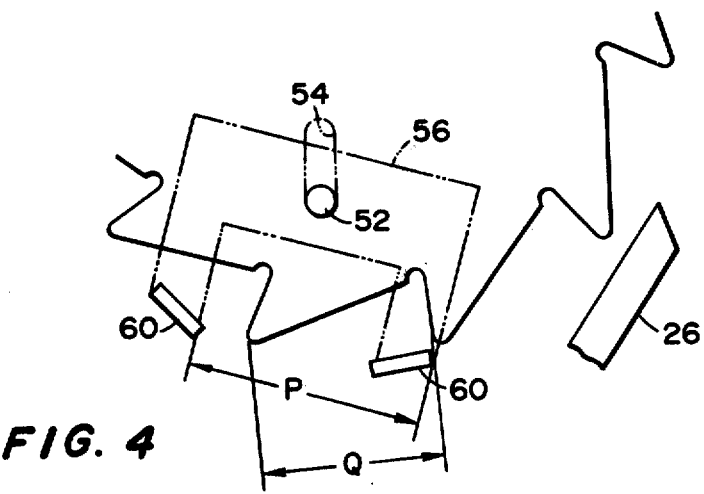
FIG. 4 is an explanatory view showing the pawls of the balancer, the pawl and the tooth top of the ratchet wheel.

Additionally, as shown in FIG. 4, the pitch P between the pair of pawls 60 of the balancer 56 and the pitch Q between the tooth tops of the ratchet wheel 22 are made different from each other, so that, if one of the pawls 60 has been sprung back by the tooth top of the ratchet wheel 22, the other of the pawls 60 can be reliably engaged with the ratchet wheel 22 without impinging on the tooth top of the ratchet wheel. Furthermore, it is easily made to provide the pawl 26 at a position where the tooth top of the pawl 26 to be rotated simultaneously with either one of the pawls 60 of the balancer 56 does not impinge on the tooth top of the ratchet wheel 22 when one of the pawls 60 is engaged with the ratchet wheel 22.

Furthermore, according to the present invention, the pawls 60 are not subjected to a large force, and hence, the tooth tops thereof can be made very acute as compared with the pawl 26. With this arrangement, there is little possibility for the pawls 60 to impinge on the tooth top of the ratchet wheel 22, and besides the above embodiment, in the case the number of the pawls 60 is made only one, the object of the present invention can be achieved.

As have been described so far, in the webbing retractor according to the present invention, the balancer actuated by the acceleration detector is moved radially of the ratchet wheel to be engaged with the ratchet wheel, the balancer is rotated by the ratchet wheel and transmits the force of rotation to the working plate whereby the pawl is reliably engaged with the ratchet wheel thus preventing wind-out rotation of the ratchet wheel. Hence, the tooth top of the pawl does not impinge on the tooth top of the ratchet wheel so that wind-out rotation of the webbing can be quickly stopped by the operation of the acceleration detector, thereby enabling to secure the occupant's safety.

Additionally, according to the present invention, the pawl is engaged with the rachet wheel where necessary, and hence, such a disadvantage which has been encountered heretofor can be avoided that, due to vibrations and the like, the pawl abuts against the ratchet wheel to generate noises.

What is claimed is:

1. A webbing retractor comprising:
   a take-up shaft pivotally supported on a frame for winding up the webbing for restraining an occupant;
   a ratchet wheel having teeth solidly secured to said take-up shaft;
   a pawl supported on the frame and adapted to be engaged with the ratchet wheel to prevent wind-out rotation of the take-up shaft when tilted;
   a working plate pivotally supported on the frame and causing said pawl to tilt when rotated;
   a balancer movable substantially radially of the ratchet wheel for engagement with said ratchet wheel and being rotatably coupled to and guided by said working plate; and an acceleration detector for moving said balancer substantially radially of the ratchet wheel to engage the ratchet wheel whereby when said ratchet wheel engages with said balancer, said balancer is caused to move by the rotation of said ratchet wheel to thereby cause said working plate to rotate and tilt said pawl into engagement with said ratchet wheel.

2. A webbing retractor as set forth in claim 1, characterized in that two pawls are projected from said balancer for the engagement with said ratchet wheel.

3. A webbing retractor as set forth in claim 2, characterized in that the pitch between said two pawls and the pitch between the tooth tops of the ratchet wheel are different from each other.

4. A webbing retractor as set forth in claim 1, characterized in that said acceleration detector comprises a suspended pendulum and an arm to be tilted by said pendulum for operating said balancer.

5. A webbing retractor as set forth in claim 1, characterized in that said working plate is pivotally supported on the outside of said frame.

6. A webbing retractor comprising:
a take-up shaft pivotally supported on a frame for winding up the webbing for restraining an occupant;
a ratchet wheel having teeth solidly secured to said take-up shaft;
a pawl supported on the frame and adapted to be engaged with the ratchet wheel to prevent unwinding rotation of the take-up shaft when tilted;
a working plate pivotally supported on the frame and causing said pawl to tilt when rotated;
a balancer movable substantially radially of the ratchet wheel upon engagement with said ratchet wheel and being guided by said working plate, said balancer further including two pawls for engagement with said ratchet wheel, said balancer being pivotally supported on a pin such that said two pawls are disposed horizontally with each other; and
an acceleration detector for moving said balancer substantially radially of the ratchet wheel to engage one of the pawls on the balancer with the ratchet wheel whereby when one of the ratchet teeth strikes one of the pawls the other pawl engages one of the ratchet teeth.

7. A webbing retractor as set forth in claim 6, characterized in that said acceleration detector comprises a suspended pendulum for operating said balancer and an arm to be tilted by said pendulum and said pin is mounted on said arm.

8. A webbing retractor as set forth in claim 6, characterized in that said working plate is provided with elongate holes for guiding said pawl and said pin.

9. A webbing retractor as set forth in claim 8, characterized in that said working plate is biased such that said plate can rotate in one direction only.

10. A webbing retractor as set forth in claim 5 or 9, characterized in that said working plate is prevented from falling off axially by means of a stopper installed on the outside of said frame and is regulated in angle of rotation.

11. A webbing retractor as set forth in claim 10, characterized in that biased rotation of said working plate in one direction is made by a spring stretched between said working plate and said stopper.

12. A webbing retractor as set forth in claim 4 or 7, characterized in that said pendulum is suspended from a bracket installed on said frame.

* * * * *